Oct. 14, 1930.  H. ERNST  1,778,452
GRINDING MACHINERY
Filed Aug. 9, 1926  2 Sheets-Sheet 2
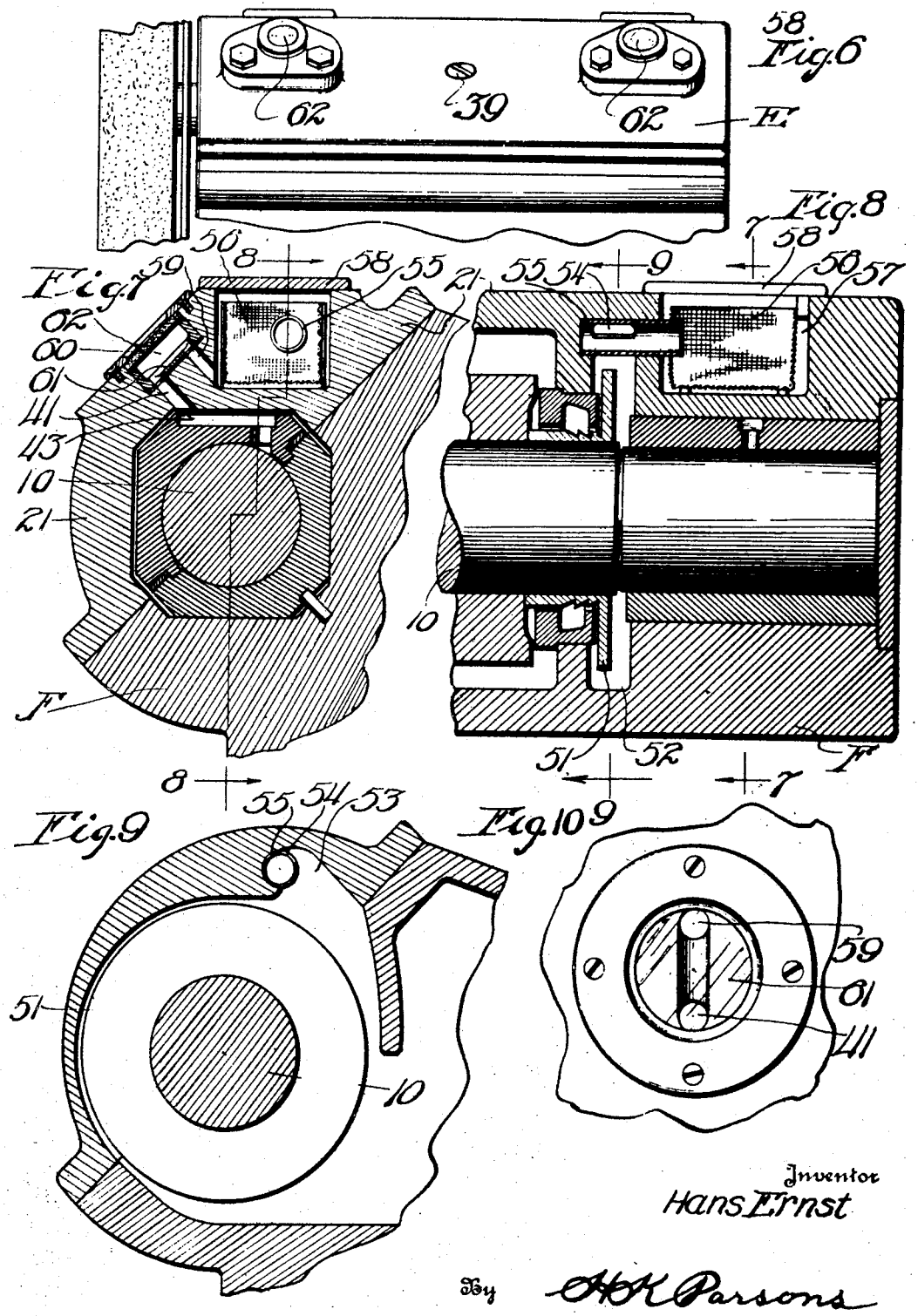
Inventor
Hans Ernst
By H. K. Parsons
Attorney Patented Oct. 14, 1930

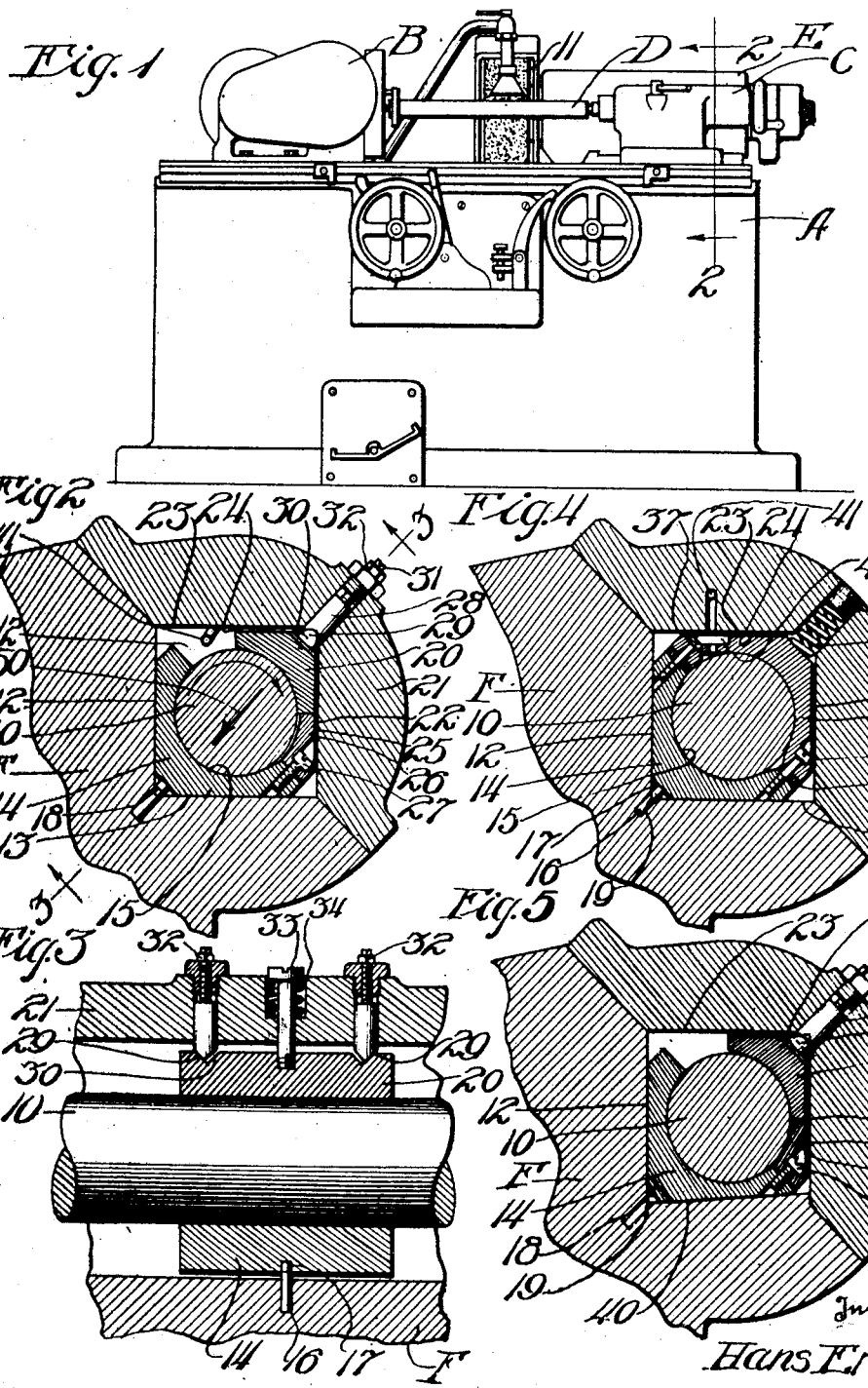

1,778,452

UNITED STATES PATENT OFFICE

HANS ERNST, OF CINCINNATI, OHIO, ASSIGNOR, BY MESNE ASSIGNMENTS, TO CINCINNATI GRINDERS INCORPORATED, OF CINCINNATI, OHIO, A CORPORATION OF OHIO

GRINDING MACHINERY

Application filed August 9, 1926. Serial No. 128,168.

This invention relates to improvements in grinding machinery and has particular reference to a novel and improved form of bearing construction for supporting the grinding wheel spindle.

In precision grinding machinery of the type here illustrated, use is made of a large and heavy grinding wheel supported by a spindle rotating at a high rate of speed. Such machines are intended for the production of work of extreme accuracy, frequently within limits of .0001″ or .0002″. To enable the machine to operate within fine limits of this nature, it is necessary that accurate bearings be provided which will restrain vibration or play of the spindle and grinding wheel to a maximum degree and at the same time which will so fit the spindle and be so lubricated as to prevent liability of overheating and sticking of the bearing. This condition presents a difficult problem in spindle bearing construction which has been the subject of considerable time and effort in the past.

The structures of the prior art however, have been open to the objection that the bearing member whether of half-bearing or full-bearing type has been so constrained in its tendency toward expansion under service conditions that slight overheating has caused the bearing to grip or bind on the shaft. This binding in turn produces greater overheating and on account of the restrained nature of the bearing has caused it to swell and buckle and either the bearing itself or the shaft become scored and its efficiency impaired.

It is one of the purposes of the present invention to obviate the difficulties experienced with bearing structures of the prior art through the provision of an unconfined bearing capable of expansion in a manner to prevent wedging and gripping of the shaft or buckling of the bearing.

A further object of the invention is the provision of an improved compensating bearing which will maintain a uniform steadying effect against the spindle under service conditions, and which will be capable of guided expansion to a sufficient degree to prevent undue overheating through bearing friction.

Other objects and advantages of the present invention should be readily apparent by reference to the following specification taken in connection with the accompanying drawings and it will be understood that I may make any modifications in the specific structural details hereinafter shown and scribed within the scope of the appended claims without departing from or exceeding the spirit of the invention.

Figure 1 is a front view of a grinder having my improvements applied thereto.

Figure 2 is a sectional view on the line 2—2 of Figure 1.

Figure 3 is a fragmentary longitudinal section of the bearing and spindle on line 3—3 of Figure 2.

Figure 4 is a transverse section of a full bearing structure embodying my improvements.

Figure 5 is a similar section of a controlled compensating bearing construction.

Figure 6 is an enlarged fragmentary view of the spindle bearing cap and associated parts.

Figure 7 is a section as on line 7—7 of Figure 6.

Figure 8 is a fragmentary longitudinal section on line 8—8 of Figure 7.

Figure 9 is a transverse section on line 9—9 of Figure 8, and

Figure 10 is an enlarged view looking at the oiler opening.

In the drawings the letter A designates the bed of a conventional form of cylindrical grinder having the headstock B and tailstock C for supporting and driving a work-piece D. Mounted on the bed is a sliding carriage E having the boxes F to support the bearings for the spindle 10 of grinding wheel 11.

One of the novel features of the present invention is the manner in which these boxes F are constructed. Prior to my invention it has been customary to form these of general circular outline and to fit therein a bearing member of cylindrical or semi-cylindrical form, said bearing being usually secured at its edges to retain it in the box.

I have discovered that structures of this sort are unsatisfactory in use, due to the fact that as the bearing tends to heat during service conditions the metal seeks to expand in all directions. The result of this expansion in a confined or rigidly held bearing is twofold. The material on account of longitudinal confinement will tend to buckle inwardly and also, on account of radial expansion with an outer confining box the metal will be forced to expand inwardly contracting the size of the bearing. This increases the frictional engagement with the shaft mounted therein, producing heat and additional metal expansion, the ultimate result being sufficient expansion to either cause the spindle to stick and fail to function or a tearing away or burning away of the metal of the bearing itself.

To obviate these difficulties I form in the member F a V like or right angle seat having for example the vertical wall 12 and horizontal or base wall 13 which in the principal views illustrated are disposed at right angles one to the other. Seated on these is the lower half-bearing 14 having the inner cylindrical surface 15 for engagement with the shaft 10 and having outer vertical and horizontal walls cooperating respectively with the walls 12 and 13 of the box. Referring particularly to Figures 2 and 3 it will be noted that this lower half-bearing 14 simply rests in the trough of the box and is steadied but not locked in position by the dowel 16 fitting in slot 17 of the bearing. It will further be noted that the edge of the bearing is beveled off as at 18 to avoid an absolute tight corner fit of the parts. With a bearing of this right triangular form merely steadied in position within the supporting box F there is no confinement of the bearing either laterally or longitudinally limiting its tendency toward expansion, with the result that on heating there will be a free or unconfined expansion of the metal in all directions, this expansion being in general radial from the prime point of rest which may be considered as the apex 19 of the angle formed by the two sides. This is for the reason that the bearing can move no further in this direction, but can in expanding creep along side 12 and along side 13, so long as there is no positive restraint provided for such creeping action.

I have discovered that a bearing of this sort will therefore expand equally in all directions and will produce an effect of a slight opening up or increasing of the size of circle of the cylindrical face 15, in place of contracting at its corners against the spindle as has been the case with ordinary previous cylindrical or other confined bearing.

To retain the spindle 10 in proper seating engagement with the lower half-bearing 14, use may be made of either a complete upper bearing member or of a separate contact shoe as may be preferred. In Figures 2, 3 and 5 I have shown the use of a contact shoe 20. This bearing member or shoe is disposed within the bearing cap 21 which has a corresponding V or rectangular socket comprising the wall 22 parallel with wall 12 and wall 23 parallel with wall 13, forming an inclosing square. The box and cap and the contained-bearing however, in place of being transversely split are diagonally split from corner to corner. Also, the size of the shoe is sufficiently less than the space inclosed within the bearing box and the cap to provide clearance as indicated at 24 and 25. To steady the shoe in position against rotative movement or wedging within the box, use is made of the interposed filler member 26 having a clearance as respects both the spindle 10 and the wall 25 of the cap. This filler member is secured to the lower bearing 14 as by bolts 27 and is therefore capable of movement therewith as the latter expands or contracts. It forms a rest and steadying device retaining the shoe against circumferential movement in the direction of rotation of the spindle.

To hold the shoe in proper steadying engagement with the spindle and at the same time to permit of relative expansion of the parts to compensate for heating, use is made of the pins shown in Figure 3. These comprise a pair of pins 28 having the wedgelike termini 29 engaged with the outer faces of the V notches 30 in the bearing shoe. Adjusting screws 31 with lock nuts 32 serve to control the pressure of pins 28 against the V walls of notches 30. It will be noted that a structure of this sort will be longitudinally self-centering. Also, as the shoe tends to heat due to expansion of the lower bearing and consequent increase of pressure, this heating will cause a longitudinal expansion or elongation of the shoe 20, with the result that the outer walls of the V notches will tend to move away from the wedge pins, allowing the shoe to automatically compensate for the increase in pressure, by moving outward slightly as respects the lower bearing member. Steadying pin 33 and spring 34 in cooperation therewith serve to normally urge the shoe in the direction of pins 28.

In Figure 4 I have illustrated an alternative form of construction in which use is made of a complete or full-bearing in place of a half-bearing and steadying shoe. In the heating of an unconfined body there is a tendency for equal expansion in all directions and if there be a central circular passage in said body, heating will tend to increase its diameter, this being an old and well known principle which has been employed in the past for example in the application of tires to carriage wheels. It is here utilized by forming a complete upper half-bearing 35 for cooperation with the lower half-bearing 14, the two being preferably formed as a single unitary square piece of material with central aperture of the prescribed size being then split into two sections, shims 36 being employed to fill up the space caused by splitting. In this form bolts 37 serve to unite the two halves of the bearing.

As with the shoe just described, a clearance is left between the upper bearing member and the adjacent walls of the bearing cap 21, allowing of unconfined expansion of the bearing member. In view of this clearance, use is made of compression springs 38, whose tension is adjusted as by the screw plugs 39. These springs bear at one end against the screw plugs of the cap and at the other against the bearing, tending to urge it downward toward the corner 19 with a sufficient pressure to eliminate vibration or jumping of the spindle and bearing within its support F, while at the same time the tension of the springs is sufficiently light to permit of their compression as the bearing itself expands and tends to fill up the entire space between the box and cap.

In Figure 5 there has been illustrated a slight modification in which there is a limited restriction of the expansion of the bearing. This is accomplished by utilization of a lower wall 40 disposed at a slight angle to the vertical wall 12 with the result that the V is a few degrees less than a 90° angle. This slightly constricts the direct vertical and lateral expansion tending to reduce the enlargement of the diameter of the circular bearing and to maintain it more nearly constant and to this degree to compensate for its expanding tendency. The structure here illustrated is otherwise the same as that described in connection with Figures 2 and 3 of the drawings.

From the foregoing description it will be seen that I have provided an improved automatically compensating bearing for use in severe service conditions where maximum accuracy of fit and elimination of vibration is desirable.

It will be understood that it is necessary to suitably lubricate bearings of this nature preferably by maintaining an oil film on the surface of the rotating shaft. For this purpose use is made of an oil distributor pipe 41 supplied with oil in any suitable manner and feeding the oil either into the space 42 between the bearing and shoe in Figure 2 of the drawings or into a suitably formed recess 43 in the case of the enclosed upper half-bearing of Figure 4. The oil so introduced will be carried around by the rotating shaft within the bearing and maintain a suitable oil film facilitating proper rotation of the parts and reducing the overheating tendency thereof when the shaft is rotated at high speeds.

It will be noted that in the drawings the bearing box has been shown with vertical and horizontal walls forming substantially a bearing receiving V and that the bearing itself is high at the rear and quite low at the front. This is due to the fact that the pressure of the grinding wheel 11 against the work tends to press the wheel toward the back of the bearing while at the same time the pull of the drive belt rotates the spindle in the direction of the curved arrow shown in Figure 2, pulling the spindle downwardly and rearwardly into the bearing so that the resultant of the forces is substantially that indicated by the arrow 50 in Figure 2 or toward apex 19 of the angle of the V. This therefore forms the restraining point or point of rest of the bearing resisting maximum pressure of movement, while the two wings or terminal portions of the bearing are free to creep along the side walls for proper unconfined expansion.

The method of supplying oil to this type of bearing has been particularly illustrated in connection with Figures 6 to 10 inclusive. As there illustrated, use is made of the oil slinger or disk 51 secured on spindle 10 and running in oil pocket 52. This slinger throws oil upward into the pocket 53 whence it feeds through slot 54 into distributing tube 55. This tube projects laterally above the bearing proper and discharges into the removable strainer 56 which is mounted within the oil distributing recess 57 and beneath cap 58, which may be removed for withdrawal and cleaning of the strainer. From the pocket 57 an oil pipe 59 extends diagonally upward, so that there is no flow through this pipe until the pocket 57 is partially filled with oil. The pocket thus forms a second settling chamber for dirt and sediment. As the pocket is filled the oil will flow outwardly from pipe 59 into the sight feed aperture 60 which contains preferably a whitened disk 61 over the surface of which the oil passes, being readily visible through the window 62 at the front of the machine. The oil then flows downwardly as through distributor pipe or tube 41 into the oil receiving recess 43 at the top of the bearing as was previously described for example, in connection with Figure 4 of the drawings.

It is apparent that the present construction provides a fully automatic lubrication in which the oil is raised by the slinger 51, caught by the initial distributing pipe 55, passed through a suitable strainer and settling chamber to remove dirt and sediment after which gravity carries the oil through the bearing when it will be returned to the original oil well for re-engagement with the slinger. During this progress the flow of oil beneath the window 62 across the whitened bottom disk 61 renders the oil clearly visible, so that the operator is sure that a proper amount of lubrication is continually reaching the bearings.

From the foregoing description the structural features of the present improved bearing should be readily understood and it will be noted that there has been provided in the present invention a rigidly supported journal bearing member which is unconstrained in that it is free to expand without distortion. The construction is such that the journal bearing member is carried between two rigidly mutually inclined supporting surfaces and by virtue of its shape and method of support will rigidly resist movement in two radially divergent directions in the plane of rotation and is free to expand when heated and if subject to substantially uniform heat will so expand without change in its original proportions. The inclined supporting surfaces for the bearing member as illustrated and in its preferred embodiment are so disposed that their included angle is approximately bisected by the line of the average resultant bearing pressure. The bearing in question is preferably yieldably urged into its seat against the inclined surfaces and fits loosely within the supporting box so that the box itself will in nowise cramp or interfere with the normal expansion. It is to be particularly noted that the expanding tendency of an unrestrained or unconfined bearing is like that of a metal wheel rim, in other words increasing the inner diameter so long as it is not prevented from such expanding movement by restraining walls of a box or the like. In the form of Figure 4 for example, this feature has the advantage that as the temperature increases the bearing clearance will also increase, thus providing space for a thicker oil film with a consequent tendency to reduction of temperature, so that a condition of equilibrium is arrived at for every condition of loading.

I claim:—

1. A grinding machine of the character described including a V shaped bearing box and an unconstrained bearing fitting within the box and having its outer surfaces engaging the walls of the V bearing and having an inner curved spindle engaging surface, a grinding wheel spindle journaled in said bearing and supported thereby, means steadying the spindle and bearing in position within the box, the bearing having a relieved portion at one edge thereof, and means for supplying lubricant to the spindle, the relieved portion facilitating formation of an oil film between the bearing and spindle.

2. In a grinding machine, the combination with a wheel supporting member having a V shaped recess formed therein, of a spindle bearing in the form of a V block fitting within the recess and having a semi-cylindrical bearing face to receive the grinding wheel spindle, the apex of the V being disposed substantially in the line of resultant of the forces, acting on the spindle and bearing and means centrally engaging the bearing at its apex to prevent longitudinal movement thereof as an entirety without restraint of longitudinal expanding movement.

3. A grinding machine structure including a wheel support having an angular recess formed therein and a spindle bearing fitting the angular recess, a spindle journaled in said bearing and urging the bearing toward the apex of the recess, the bearing having unconfined portions extending circumferentially of the spindle in a direction away from said apex, means preventing a bodily axial shifting of the bearing centrally engaging the same whereby longitudinal expansion thereof is unrestrained, and additional means restraining the bearing against bodily movement in a direction away from said apex.

4. In a machine of the character described, the combination with a bearing box and cap having angular bearing receiving recesses formed therein, said parts being diagonally divided, of a diagonally split bearing contained within the parts and comprising upper and lower V like members, the exterior dimensions of the complete bearing being less than the interior dimensions of its inclosing walls, and means urging the bearing as an entirety in a direction of one of the corners of the supporting box therefor.

5. A machine tool including a V shaped bearing support having a bearing with a correspondingly shaped outer surface and a semi-circular inner face, a spindle rotatably engaging said face, the apex of the V being located substantially in the line of maximum force application to the spindle and means engaging the spindle at a point opposing the apex for holding the spindle in engagement with the semi-circular bearing face.

6. A machine tool structure of the character described, including a bearing support having a V shaped bearing receiving recess therein and an oil pocket adjacent said recess, a spindle bearing having an outer V shaped face, adapted to conform to the recess, and an inner semi-circular spindle receiving face, a spindle journalled in the bearing, means for retaining the spindle in engagement with the bearing, said means providing an oil receiving recess, and means for supplying oil to the recess, including a slinger on the spindle riding in the oil pocket, a distributor receiving oil from the slinger, a settling chamber, an oil strainer within the chamber, an open pipe for discharging oil toward the spindle, a visibility disk over which the oil from the chamber flows to said pipe and a window overlying the disk whereby the flow of oil may be observed therefrom.

7. The combination with a substantially V-shaped bearing having a shaft receiving portion and having divergent outer walls, of a bearing box having a V-shaped seat for reception of the bearing, and having means restraining the bearing against movement on the seat along the line of average resultant pressure thereagainst, said restraining means being laterally free of the bearing to permit unrestrained expansion thereof.

8. In precision machinery a non-seizing bearing structure comprising a shaft, a support having a plane surface subtending the shaft and a second plane substantially at right angles thereto, a bearing member having its outer surfaces conforming to said surfaces of the support and having its inner face of semi-cylindrical form to fit and receive the shaft, a bearing cap loosely over-lying the member and shaft and connections between said parts and cap holding the parts toward said supporting surfaces without restraint of their expansion relative thereto.

9. In precision machinery a non-seizing bearing structure comprising a shaft, a support having a plane surface subtending the shaft and a second plane surface extending substantially at right angles thereto, a bearing member having its outer surfaces conforming to said surfaces of the support and having its inner face of semi-cylindrical form to fit and receive the shaft, a bearing cap loosely over-lying the member shaft, and connections between said parts and cap holding the parts toward said supporting surfaces without restraint of their expansion relative thereto, and interengaging means on the bearing and support for preventing relative bodily longitudinal movement thereof without restraint of their relative longitudinal expansions.

10. A bearing structure including a support having a V shaped box formed therein, a half bearing member having an outer surface conforming to the shape of the inner surface of the box and having an inner shaft receiving portion, a second half bearing for cooperation with the first, means for clamping the two together to form a full or closed bearing unit, a cap over-lying said parts in spaced relation thereto, and means carried by the cap for retaining the bearing unit as an entirety against the V shaped box without restraining bodily expansion of the bearing.

In testimony whereof I affix my signature.

HANS ERNST.